(12) United States Patent
Shinsky et al.

(10) Patent No.: US 6,285,398 B1
(45) Date of Patent: *Sep. 4, 2001

(54) CHARGE-COUPLED DEVICE VIDEO CAMERA WITH RAW DATA FORMAT OUTPUT AND SOFTWARE IMPLEMENTED CAMERA SIGNAL PROCESSING

(75) Inventors: Michael Shinsky, Menlo Park; Michael Yukelson, Sunnyvale; Leonid Milenky; Ken Carter, both of Palo Alto, all of CA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,813

(22) Filed: Apr. 21, 1998

Related U.S. Application Data (60) Provisional application No. 60/065,903, filed on Nov. 17, 1997.

(51) Int. Cl.[7] ........................................ H04N 9/73
(52) U.S. Cl. ................... 348/223; 348/229; 348/279; 348/296; 348/552; 348/655; 345/154
(58) Field of Search ...................... 348/13, 20, 24, 348/211–213, 220–224, 228, 229, 239, 254–256, 272, 273, 279, 333, 362–365, 552, 576, 577, 655; 345/154, 429–432; 396/211, 374, 429

(56) References Cited

U.S. PATENT DOCUMENTS

| | | | |
|---|---|---|---|
| 5,012,333 | * 4/1991 | Lee et al. ........................ | 358/80 |
| 5,016,107 | 5/1991 | Sasson et al. ..................... | 358/209 |
| 5,253,047 | 10/1993 | Machishima ...................... | 358/44 |
| 5,402,171 | 3/1995 | Tagami et al. .................... | 348/219 |

(List continued on next page.)

OTHER PUBLICATIONS

S. Ochi, T. Iizuka, M. Hamasaki, Y. Sato, T. Narabu, H. Abe, Y. Kagawa, and K. Kato, "Charge Coupled Device Technology," *Japanese Technology Reviews*, Section A, vol. 30, Gordon and Breach Publishers, 1996, ISBN 90–5699–001–2.

CXD 2613 Data Sheet Application Notes, Charge Coupled Devices: Designing with CCD, Sharp Electronics Corporation.

(List continued on next page.)

*Primary Examiner*—Wendy R. Garber
*Assistant Examiner*—Ngoc-Yen Vu
(74) *Attorney, Agent, or Firm*—Haverstock & Owens LLP (57) ABSTRACT

A CCD video camera is coupled to a host system. The CCD video camera captures image data representing elements in its field of view. The video camera does not include a digital signal processing circuit for processing the raw video data into the appropriate video format. The raw video data is processed and converted into the appropriate video format for display by the host computer system after it is received from the video camera. Necessary gain adjustments and control signals are calculated within the host computer and provided to the video camera or used during the digital signal processing of the video data to adjust the parameters of the data before the video images are displayed. A histogram is generated in order to continually monitor and adjust the exposure and gain of the system and thereby appropriately change the necessary control signals for optimal performance. Through a graphical user interface a user can view the video images, set a proper white balance for the images by selecting a white area within the picture and view the histogram. A higher resolution scan mode is also used when capturing still images.

32 Claims, 6 Drawing Sheets

U.S. PATENT DOCUMENTS

| | | | |
|---|---|---|---|
| 5,420,573 | | 5/1995 | Tanaka et al. ............... 340/825.24 |
| 5,426,517 | * | 6/1995 | Schwartz ............................ 358/520 |
| 5,457,494 | | 10/1995 | Suga et al. ......................... 348/229 |
| 5,486,853 | * | 1/1996 | Baxter et al. ..................... 348/222 |
| 5,493,332 | * | 2/1996 | Dalton et al. ..................... 348/207 |
| 5,557,724 | | 9/1996 | Sampat et al. ...................... 725/43 |
| 5,568,192 | * | 10/1996 | Hannah ............................. 348/222 |
| 5,585,856 | * | 12/1996 | Nakaya ............................. 348/441 |
| 5,627,603 | | 5/1997 | Sakai ................................ 348/708 |
| 5,650,775 | | 7/1997 | Van Steenbrugge ........... 340/825.24 |
| 5,668,596 | | 9/1997 | Vogel ................................ 348/222 |
| 5,758,094 | * | 5/1998 | Goettsch ........................... 348/219 |
| 5,781,599 | | 7/1998 | Shiga ................................ 375/376 |
| 5,818,975 | * | 10/1998 | Goodwin ........................... 382/274 |

OTHER PUBLICATIONS

Presentation entitled "NEC USB Video Camera Architecture," Tetsuya Minakami, NEC Corporation, United States, Apr. 6, 1997.

CXD3123R Data Sheet, Signal Processing LSI for Multimedia CCD Color Camera, Ver. 1.2, Sony Corporation, San Jose, CA, Feb. 12, 1998, p. 1–30.

CXD2163R Data Sheet, Signal Processor LSI for Single-Chip CCD Color Camera, Sony Corporation, San Jose, CA, 1998, p. 1–57.

* cited by examiner

CHARGE-COUPLED DEVICE VIDEO CAMERA WITH RAW DATA FORMAT OUTPUT AND SOFTWARE IMPLEMENTED CAMERA SIGNAL PROCESSING

RELATED APPLICATIONS

This application claims priority under 35 U.S.C. §119(e) of the co-pending U.S. provisional application Ser. No. 60/065,903 filed on Nov. 17, 1997 and entitled "Charge-Coupled Device Video Camera With Raw Data Format Output And Software Implemented Camera Signal Processing." The provisional application Ser. No. 60/065,903 filed on Nov. 17, 1997 and entitled "Charge-Coupled Device Video Camera With Raw Data Format Output And Software Implemented Camera Signal Processing" is also hereby incorporated by reference.

FIELD OF THE INVENTION

The present invention relates to the field of capture, transmission, representation and manipulation of video data. More particularly, the present invention relates to the field of capture, transmission, representation and manipulation of video data and control of a video camera used to capture the video data.

BACKGROUND OF THE INVENTION

Figure 1:
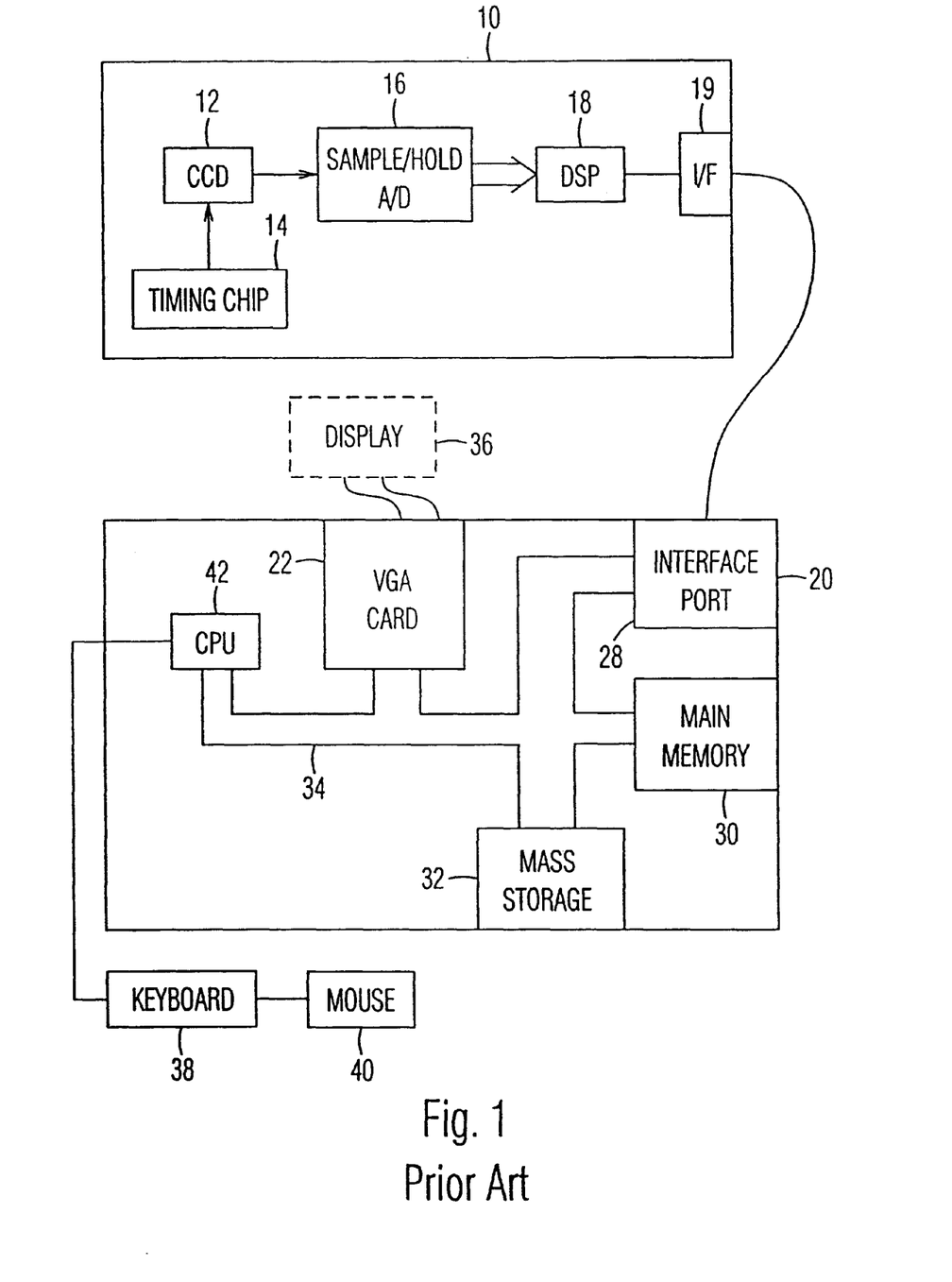
FIG. 1 illustrates a schematic block diagram of a configuration including a CCD video camera and a host computer of the prior art.

A schematic block diagram of a configuration including a video camera and a host computer is illustrated in FIG. 1. The video camera 10 includes a charge-coupled device (CCD) 12 and is coupled to the host computer 20 for providing video data from the video camera 10 to the host computer 20. Within the video camera 10, the CCD 12 is coupled to a timing chip 14 which provides a clocking signal to the CCD 12. The CCD 12 is also coupled to a sample and hold and analog-to-digital converter circuit 16. The CCD 12 provides image data at a rate determined by the timing chip 14 to the sample and hold and analog-to-digital converter circuit 16. This image data is then sampled and converted into a digital format by the sample and hold and analog-to-digital converter circuit 16. The sample and hold and analog-to-digital converter circuit 16 is coupled to a digital signal processing (DSP) circuit 18. The DSP circuit 18 receives the digital data from the sample and hold and analog-to-digital converter circuit 16 and converts it into an appropriate video format, such as RGB, $YC_RC_B$, NTSC, PAL or any other appropriate format. The DSP circuit 18 is then coupled to an interface circuit 19 for providing the video data for transmission from the video camera 10 to a device coupled to the video camera 10.

In the configuration illustrated in FIG. 1, the video camera 10 is a stand-alone camera and is coupled to a host computer 20 through which the video data transmitted from the video camera 10 can be displayed on an associated display 36, saved and/or transmitted to another device. The interface circuit 19 of the video camera 10 is coupled to an interface circuit 28 of the host computer 20 by a bus or cable for transmitting the video data from the video camera 10 to the host computer 20. The host computer system 20, illustrated in FIG. 1, is exemplary only and includes a central processor unit (CPU) 42, a main memory 30, a video graphics adapter (VGA) card 22, a mass storage device 32 and an interface circuit 28, all coupled together by a conventional bidirectional system bus 34. The mass storage device 32 may include both fixed and removable media using any one or more of magnetic, optical or magneto-optical storage technology or any other available mass storage technology. The system bus 34 contains an address bus for addressing any portion of the memory 30. The system bus 34 also includes a data bus for transferring data between and among the CPU 42, the main memory 30, the VGA card 22, the mass storage device 32 and the interface circuit 28.

The host computer system 20 is also coupled to a number of peripheral input and output devices including the keyboard 38, the mouse 40 and the associated display 36. The keyboard 38 is coupled to the CPU 42 for allowing a user to input data and control commands into the computer system 20. A conventional mouse 40 is coupled to the keyboard 38 for manipulating graphic images on the display 36 as a cursor control device.

The VGA card 22 interfaces between the components within the computer system 20 and the display 36. The VGA card 22 converts data received from the components within the computer system 20 into signals which are used by the display 36 to generate images for display.

In the configuration illustrated in FIG. 1, the data read out from the CCD 12 is provided to the sample and hold and analog-to-digital converter circuit 16 where it is converted into a digital format. This digital data is raw video data representing the data read out from the CCD 12. This digital data from the sample and hold and analog-to-digital converter circuit 16 is provided to the DSP circuit 18 where it is converted into the appropriate video data format before it is transmitted from the video camera 10. As described above, the appropriate video format can include RGB, $YC_RC_B$, NTSC, PAL or any other appropriate format. Assuming eight (8) bit resolution per each color component or raw data, data in the RGB format requires twenty-four (24) bits per pixel and therefore three times as much bandwidth for transmission as the raw video data. Correspondingly, data in the $YC_RC_B$ (4:2:2) format requires sixteen (16) bits per pixel and therefore one and a half to two times as much bandwidth for transmission compared to the raw video data. In systems with ever increasing image size, pixel density and limited transmission bandwidth capabilities, it is desirable to transmit the raw video data from a video camera because it is the format requiring the lowest data rate and correspondingly, the least bandwidth. Typical systems which receive video data from devices such as a video camera, however, are not equipped to process the raw video data and convert it into the appropriate format for display. Accordingly, transmission of the raw video data from a CCD camera to a receiving device is not used in typical systems.

Typical consumer video cameras, such as the camera 10, maintain automatic control over the main functions and settings of the camera, including control of the iris or electronic shutter speed, control of the automatic gain control (AGC) to obtain the proper signal level, back light compensation, and auto white balance. Typically, the camera will determine the proper back light compensation based on some selected frames of video data. The auto white balance is performed automatically by the camera, assuming it can determine which areas within the picture should be white. All of these control functions are performed automatically by the DSP circuit 18 with no involvement from the user.

Figure 2:
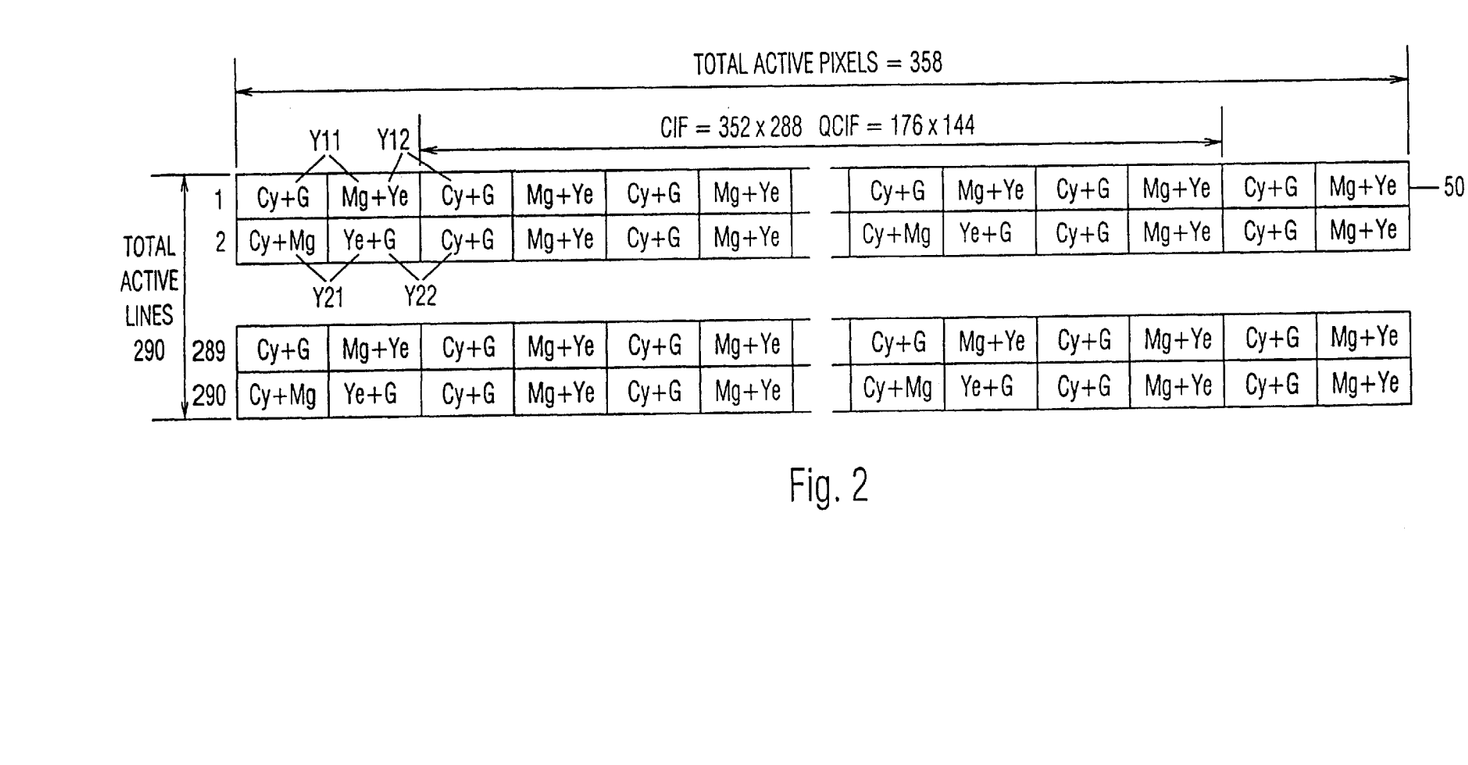
FIG. 2 illustrates a tile structure of a frame of color pixels read out from a CCD.

The CCD 12 typically includes a Yellow-Cyan-Magenta-Green mosaic color filter, as is well known in the art. Using this mosaic filter, the CCD 12 captures color images and outputs data representing the color images. The color image data from the CCD 12 is combined into a tile structure, as illustrated in FIG. 2. This tile structure 50 provides raw video data representing the image captured by the CCD 12.

From this tile structure 50, the luminance and chrominance components for the video data are obtained. Within the tile structure 50, pixels representing different colors are arranged adjacent to each other.

The raw video data in the tile structure of the CCD color space cannot be scaled or compressed without violating the tile structure of the frame represented by the raw video data. Compression requires a correlation of data between adjacent pixels, either horizontally or vertically. Data in the tile structure of the CCD color space does include some correlation. However, in its regular format, direct manipulation of raw data pixels in the tile structure of the CCD color space will lead to severe color and luminance errors, due to the adjacent relationship of colored pixels of different colors within the tile structure.

As with many other devices, the size and weight of the video camera are important characteristics considered by a system designer or perspective purchaser. It is therefore desirable to minimize the size and weight of the video camera where it is feasible and appropriate. Including the DSP circuit 18 within the camera 10 and requiring the processing of the video data to be completed within the camera 10 increases the necessary size of the video camera 10 and thereby also increases its weight.

What is needed is a video camera which can be easily integrated into a supporting device, such as a personal computer. What is further needed is a video camera which will transmit raw video data to the supporting device where it can then be appropriately converted and processed into the proper video format. What is still further needed is a graphical user interface which allows a user to easily control and monitor the operation of a video camera.

SUMMARY OF THE INVENTION

A CCD video camera is coupled to a host system. The CCD video camera captures image data representing elements in its field of view. The video camera does not include a digital signal processing circuit for processing the raw video data into the appropriate video format. The raw video data is processed and converted into the appropriate video format for display by the host computer system after it is received from the video camera. Necessary gain adjustments and control signals are calculated within the host computer and provided to the video camera or used during the digital signal processing of the video data to adjust the parameters of the data before the video images are displayed. A histogram is generated in order to continually monitor and adjust the exposure and gain of the system and thereby appropriately change the necessary control signals for optimal performance. Through a graphical user interface a user can view the video images, set a proper white balance for the images by selecting a white area within the picture and view the histogram. A higher resolution scan mode is also used when capturing still images.

DETAILED DESCRIPTION OF THE PREFERRED EMBODIMENT

A video camera of the present invention includes the capability to transmit raw video data representing frames of images captured by a CCD. The video camera is coupled to a host computer system and does not include a DSP circuit for processing and converting the raw video data into the appropriate video format. The raw video data is transmitted from the video camera to a host computer where it is processed and converted into the appropriate video format for display, storage and/or transmission by the host computer. During this processing, the host computer system determines the necessary gain adjustments and processes the video data accordingly before the video images are displayed. The necessary values of control signals are also determined and provided to the video camera. A histogram is generated in order to continually adjust the gain and appropriately change the control signals. Through a graphical user interface, a user has the ability to view the video images being captured by the camera, set a proper white balance by selecting a white area within the picture and view the histogram. A higher resolution scan mode is also used when capturing still images.

Image Capturing and Signal Processing

Figure 3:
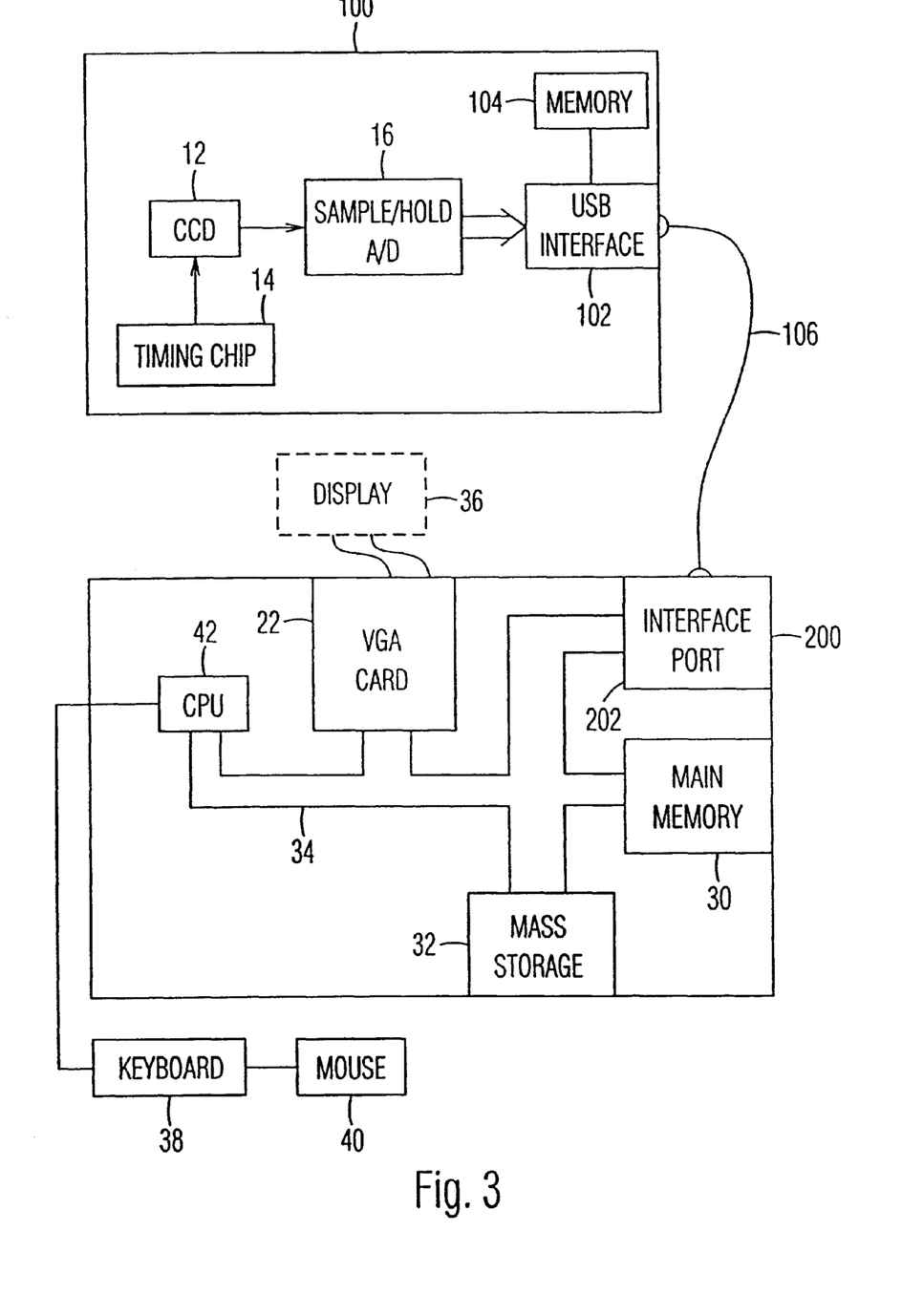
FIG. 3 illustrates a schematic block diagram of a configuration of the preferred embodiment of the present invention including a CCD video camera and a host computer.

A schematic block diagram of a configuration of the preferred embodiment of the present invention, including a CCD video camera and a host computer, is illustrated in FIG. 3. The video camera 100 includes the CCD 12 and is coupled to the host computer 200 for providing video data from the video camera 100 to the host computer 200. The video camera 100 does not include a DSP circuit for processing and converting the raw video data into an appropriate video format such as RGB, $YC_RC_B$, NTSC or PAL. Within the video camera 100, the CCD 12, the timing chip 14 and the sample and hold and analog-to-digital converter circuit 16 are all in the same configuration and perform the same functions as described above with respect to the video camera 10, illustrated in FIG. 1. As described above, the CCD 12 provides image data to the sample and hold and analog-to-digital converter circuit 16 representing images captured by the CCD 12. This image data is then sampled and converted into a digital format by the sample and hold and analog-to-digital converter circuit 16. The sample and hold and analog-to-digital converter circuit 16 is coupled to the universal serial bus (USB) interface circuit 102. The digital raw video data from the sample and hold and analog-to-digital converter circuit 16 is provided to the USB interface circuit 102.

Within the video camera 100, the USB interface circuit 102 is coupled to the memory circuit 104. Preferably, the memory circuit 104 is a dynamic random access memory. Alternatively, the memory circuit 104 is any appropriate memory circuit or device. The raw video data from the sample and hold and analog-to-digital converter circuit 16 is written into the memory circuit 104 from the USB interface circuit 102. After the data for a complete video frame is written into the memory circuit 104, the raw video data is read from the memory circuit 104 for each color plane by separately reading the pixel data corresponding to each color plane. After the pixel data for each color plane in the frame is read from the memory 104, the pixel data within the color plane is scaled and compressed for transmission to the host computer 200, as taught within U.S. patent application Ser. No. 08/946,301, filed on Oct. 7, 1997 and entitled METHOD OF AND APPARATUS FOR TRANSMITTING SCALED AND COMPRESSED RAW CCD VIDEO DATA FROM A VIDEO CAMERA, which is hereby incorporated by reference.

Once each color plane is scaled and compressed, if scaling and compression is required by the system, the data representing each separate color plane is transmitted to the host computer 200. Preferably, the USB 106 is used to transmit the data from the USB interface circuit 102 in the video camera 100 to the USB interface circuit 202 in the host computer 200. Alternatively, any other appropriate connection can be used to transmit data from the video camera 100 to the host computer 200. When received at the host computer 200, the data is preferably written into the main memory 30 and then processed by the host computer 200. The host computer 200 includes the software and components necessary to process and convert the received data. The received data is decompressed by the host computer 200, if necessary. The decompressed data representing the four original color planes of the frame is then combined into the tile structure of the raw video data, representing the frame image output from the CCD 12. This raw video data is then processed and converted by the host computer 200 into the appropriate video format, e.g., RGB, $YC_RC_B$, NTSC, PAL or any other appropriate format. After this conversion, the data is then displayed on the display 36, saved in the mass storage device 32 or transmitted to another device, as appropriate.

Figure 4A:
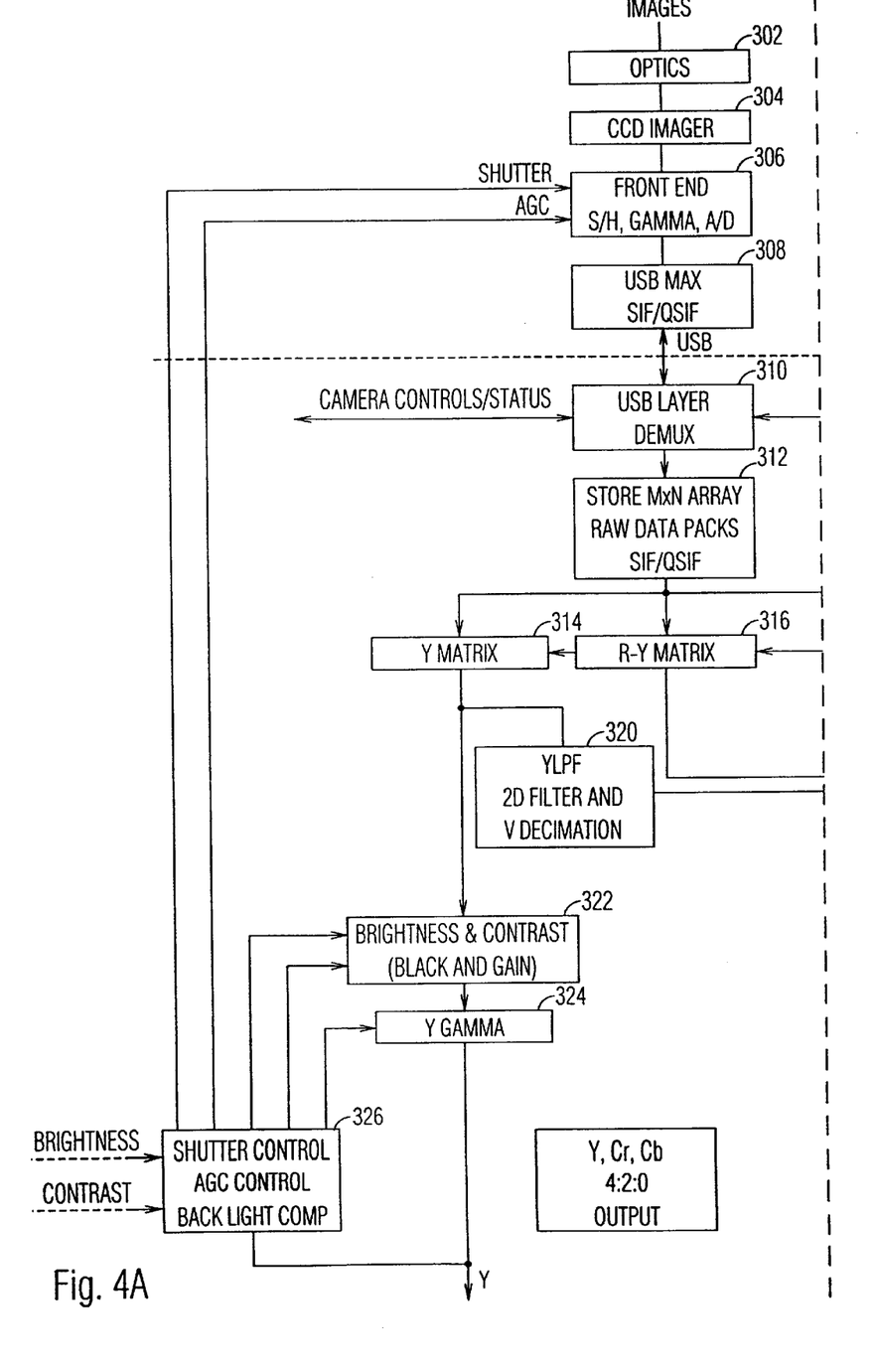
FIG. 4 illustrates a signal processing diagram according to the preferred embodiment of the present invention.
Figure 4B:
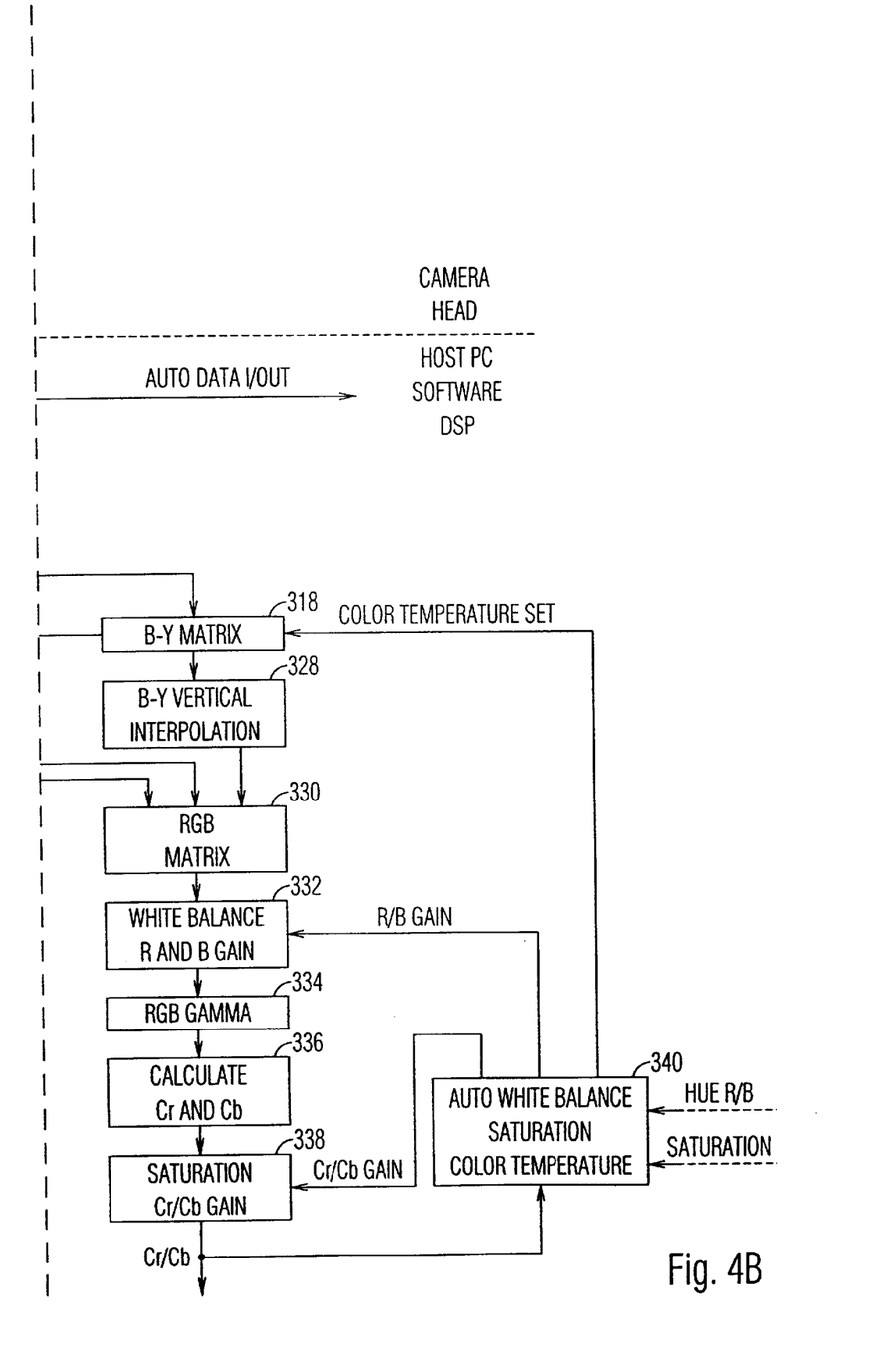
Figure 5:
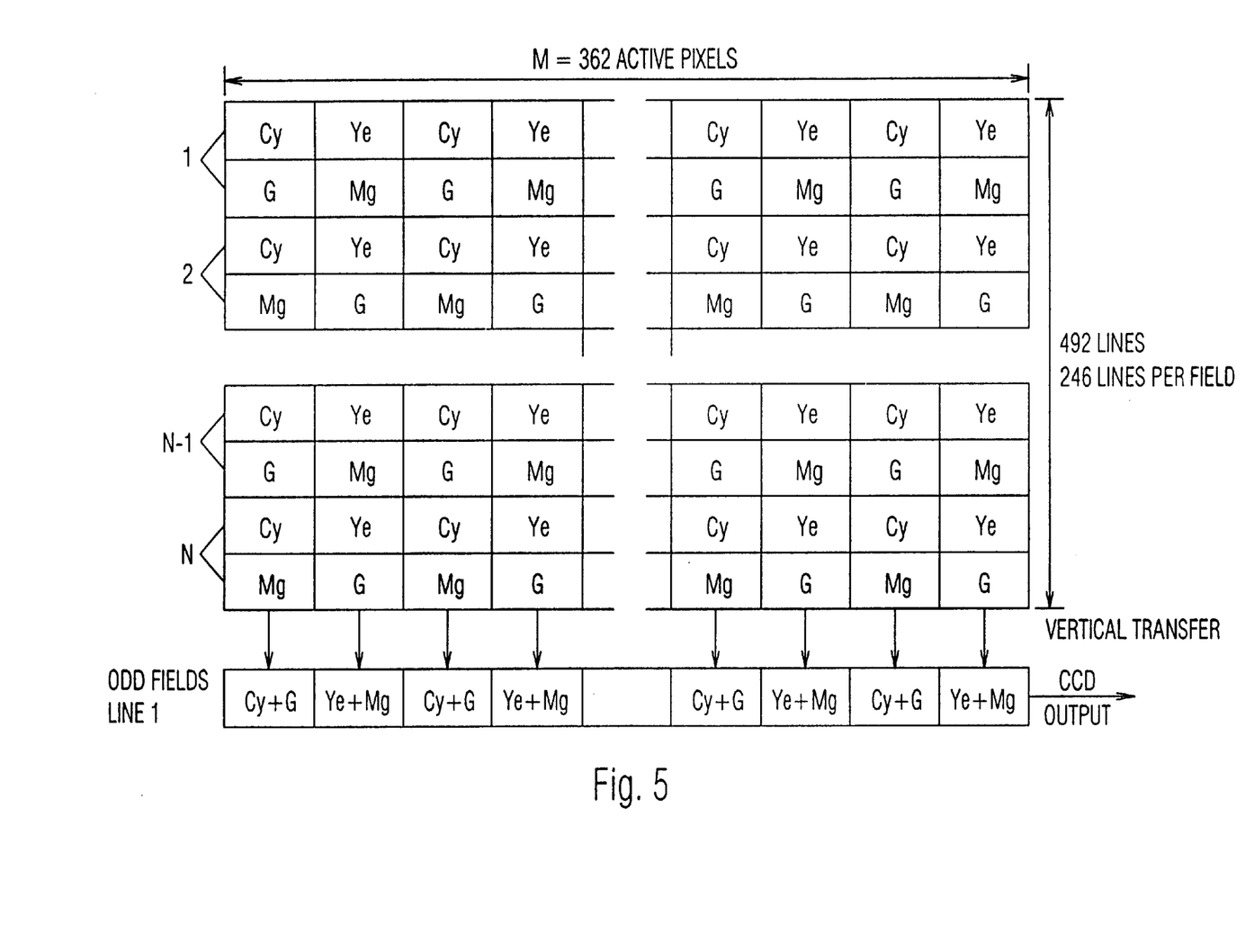
FIG. 5 illustrates the preferred tile structure of the color image data from the CCD.

In the preferred embodiment of the present invention, the video data is converted by the host computer 200 into the $YC_RC_B$ format. A signal processing diagram illustrating the signal processing flow of the video data according to the present invention is illustrated in FIG. 4. The signal processing within the blocks 302, 304, 306 and 308 is performed within the camera 100. The remaining signal processing tasks are preferably performed within software by the host computer 200. The images are first received through the optics at the block 302 and presented to the CCD 12 at the block 304. The preferred tile structure of the color image data from the CCD 12 is illustrated in FIG. 5. The image data from the CCD 12 is then sampled and converted into a digital format by the sample and hold and analog-to-digital converter circuit 16 at the block 306. At this step, as will be discussed in detail below, an automatic gain control (AGC) signal and a shutter control signal are used to control the manipulation of the video data at this stage. This digital image data is then transmitted over the USB interface 102 to the host computer 200 at the block 308.

At the host computer 200, the video data is received by the USB interface 202 at the block 310. Also, at the block 310, the camera control and status signals and the audio data are separated from the video data. The M×N array, representing the frame of video data is then stored within the memory 30 at the block 312. This video data is then separated into its Y, R–Y and B–Y components at the blocks 314, 316 and 318, respectively. When separated at the blocks 314, 316 and 318, the values of the components Y, R–Y and B–Y, are also adjusted according to the current operating temperature. The luminance component Y has a full M×N array, with each pixel spatially located in the middle of each of the primary color pixels. Preferably, a full bandwidth luminance signal Y is formed by summing four surrounding pixels. This vertical summation is preferably performed by the CCD 12 during the vertical transfer operation. An offset and gain adjustment is performed on the full bandwidth separated luminance component Y at the block 322. This offset and gain adjustment is performed in order to create proper contrast of the image and to provide the proper back light compensation. Preferably, the contrast is controlled only in selected areas of the image. In contrast to the video camera 10 of the prior art discussed above, these adjustments are performed on the luminance video data during the digital signal processing within the host computer system 200.

A luminance gamma correction is then applied to the luminance components of the video signal at the block 324, in order to properly adjust the contrast of the video image. The appropriate value for this luminance gamma correction is determined from a lookup table stored within the computer's memory. After the luminance gamma correction is applied at the block 324, the luminance component Y is fully processed and ready for display.

This luminance component Y is also used along with brightness and contrast control input signals to provide shutter, AGC, brightness and contrast and luminance gamma control signals at the block 326. The brightness and control input signals are provided by the host computer and can be controlled by a user through a graphical user interface, which will be discussed below, and the associated input devices. The shutter and AGC control signals are provided to the sample and hold and analog-to-digital converter circuit 16 within the camera 100. The shutter control signal is used to control the electronic shutter speed. The AGC control signal is used to ensure that the proper signal level is output from the camera 100. The brightness and contrast control signals are used within the offset and gain adjustment performed at the block 322. The luminance gamma control signal is used at the block 324 as the lookup value to obtain the luminance gamma correction value from the lookup table stored within the computer's memory.

After being separated at the block 314, the luminance component Y is also filtered and decimated at the block 320. Preferably, the luminance component is filtered using a combination of a horizontal and a vertical third order finite impulse response low-pass filter. Alternatively, a higher order finite impulse response filter can be used, if required. After being filtered, both horizontal and vertical decimation are performed on the separate luminance component Y, at the block 320, in order to obtain half the horizontal and vertical luminance pixels.

The R–Y component is separated at the block 316 using the appropriate equation for the CCD. The B–Y component is separated at the block 318 using the appropriate equation for the CCD. In the preferred embodiment of the present invention, the following equations are used to separate these components:

$$R-Y=(Cy+G)-(Ye+Mg)$$

$$B-Y=(Ye+G)-(Cy+Mg)$$

Vertical interpolation is then performed on the separated B–Y component at the block 328. This interpolation is performed using a third order finite impulse response filter in order to calculate the B–Y component values corresponding to the R–Y component vertical lines. Each color component has only half of the horizontal and vertical pixels as compared to the luminance component or the raw data pixels. In addition, the R–Y and B–Y components are on separate alternating vertical lines. Accordingly, in order to calculate the RGB values for the video data, one of the color components must be interpolated for the missing vertical lines and the horizontal and vertical resolution of the luminance component must be matched to the resolution of the chrominance components. As described, in the preferred embodiment of the present invention, the vertical interpolation is performed on the B–Y component at the block 328 and the decimation is performed on the horizontal and vertical components of the luminance signal Y at the block 320 in order to match the horizontal and vertical resolution of the luminance component to the resolution of the chrominance components.

The filtered and decimated separate luminance component Y, the separate R–Y component and the separated and interpolated B–Y component are combined at the block 330 as is well known in the art, in order to generate an RGB signal representing the video data from the CCD. To achieve the proper white balance within the image, scaling on the R and B components is performed at the block 332 using an R/B gain control signal. As will be described below, the proper white balance is determined using a white object within the image as selected by the user through the graphical user interface, or if the user has not selected a white image, then the system will select an assumed white level and scale the R and B components accordingly. A gamma correction is then performed on the RGB data at the block 334 in order to achieve the proper contrast within the image. In contrast to the video camera 10 of the prior art, these adjustments are performed on the video data during the digital signal processing within the host computer 200.

After the gamma correction is performed, the RGB data is converted into separate Cr and Cb components at the block 336. The color difference format Cr/Cb is used. For an eight bit format with an RGB data range from 0 to 255 and a shifted output for Cr/Cb, the following equations are used to separate the Cr and Cb components:

$$Cb=-0.148R'-0.291G'+0.439B'+128$$

$$Cr=0.439R'-0.368G'-0.071B'+128$$

The separate Cr and Cb components are then scaled using a Cr/Cb gain value at the block 338. This scaling changes the gain on both the Cr and Cb components, thereby providing color saturation control. This scaling can also be used for hue control, by controlling the Cr and Cb components in opposite directions, thereby providing an increase on one component with the same amount of decrease on the other component. After being scaled at the block 338, the separate Cr and Cb components are fully processed and ready for display. Together, the separate luminance component Y and the separate chrominance components Cr and Cb are provided as the fully processed video signal representing the image data captured by the CCD 12. This fully processed video data is then displayed by the host computer on the display 36 within the graphical user interface of the present invention, saved in the mass storage device 32 and/or transmitted to another device, as appropriate.

The separate Cr and Cr components are used along with hue and saturation control input signals to provide a color temperature compensation control signal, an R/B gain control signal and a Cr/Cb gain control signal at the block 340. The hue and saturation control input signals are provided by the host computer and can be controlled by a user through the graphical user interface and the associated input devices. The color temperature compensation control signal is calculated at the block 340 based on the current temperature within the system and is used when separating the video data signal into its separate components at the blocks 314, 316 and 318. The R/B gain control signal is used to scale the R and B components at the block 332. The Cr/Cb gain control signal is used to scale the separate Cr and Cb components at the block 338.

Histogram

An automatic exposure algorithm is performed within the digital signal processing software in order to generate the shutter and AGC control signals provided to the camera, in order to adjust the electronic shutter speed and to ensure that the proper signal level is output from the camera 100. The automatic exposure algorithm is also used to generate the gain adjustment used at the block 322, as discussed above. This automatic exposure algorithm is based on a sparse, weighted histogram and is operated continuously while the camera 100 is turned on, thereby producing updated control signals at intervals of approximately every ten frames of exposure.

The separated luminance component is sampled and weights for sample positions are applied to the sampled pixel values to generate the weighted histogram and a weighted over exposure count. Preferably, every eighth horizontal pixel and vertical line over an area covering approximately seventy-five percent (75%) of the frame is sampled. The histogram is extrapolated to include over exposure counts and is therefore used to model the effects of gain change. A center of weight for the histogram is calculated. A profile is developed which gives an expected center of weight as a function of over exposure. Measured values are then compared to the profile, gain adjusted and applied to the extrapolated histogram, until resulting weights and over exposure are on the profile, thereby yielding a gain change ratio. This gain change ratio is then multiplied by the current total gain value in order to derive a new gain value. This new gain value then becomes the current gain value and is used to derive the appropriate shutter, AGC and gain adjustment signals.

When generating the histogram within the preferred embodiment of the present invention, the full size separate luminance component is sampled. It is preferable to obtain samples within the center region of the video frame and away from the edges, especially the top and bottom edges. Preferably, samples are taken once every eight vertical lines, beginning at the line number 32. Within each one of these vertical lines, a sample is taken for every eighth horizontal pixel, starting at the pixel number 32. For a typical frame in the preferred embodiment, twenty-eight vertical lines are sampled within each sampled frame, with a total of thirty-seven samples from each line, yielding a total of 1036 sampled pixels from each sampled frame. Each eight-bit sampled pixel value is clipped to have a value no greater than 255. The sampled pixel value is then weighted according to its location within the frame. Samples within the center of the picture are weighted more heavily than samples towards the edges of the picture. When weighting the samples, the pixel value is multiplied by a value between zero and one, depending on the location of the pixel within the frame. The weighted pixel values are then accumulated within the histogram which plots the number of occurrences of each value between zero and 255. The image statistics for the sampled frame are calculated based on this histogram. From these statistics, the gain change ratio is calculated and the current gain value is appropriately adjusted. This histogram is available for viewing by the user through the graphical user interface, which will be discussed below.

From the current gain value, the shutter, AGC and gain adjustment values are calculated. A clock scale value which has a value of 1, 2, 4 or 8 and is used as a divider of the timing clock from the timing chip 14, is also calculated.

Together, the shutter control value and the clock scale value control the exposure time. The total gain within the system is calculated by the following equation:

Total gain=$K$*(Clock Scale/Shutter)*$AGC$*Software Gain

The software gain value is the gain adjustment value used within the block 322. The constant K is equal to the largest shutter value. Preferably, the constant K is equal to $10^5$. The illumination of the system is defined to be the inverse of the total gain value.

A lookup exposure table is used to determine the AGC value and the software gain value from the clock scale and shutter values. An index value for this lookup table is determined using the following equation:

Index=($K$*Clock Scale)/Shutter

Using this index value, a value representing scaled exposure is returned from the lookup exposure table. The scaled exposure value is proportional to the exposure time. This scaled exposure value from the lookup exposure table is then used to calculate the AGC value using the following equation:

$AGC$=Gain/Scaled Exposure

The calculated AGC value is preferably within a range from 1 to 30. If the calculated AGC value exceeds this range, then the AGC value is clamped to 30. The software gain is calculated using the following equation:

Software Gain=Gain/(Scaled Exposure*$AGC$)

Accordingly, the software gain will have a value equal to 1 unless the AGC value was clamped to 30. As described above, these control values are then used to appropriately process the video data.

Graphical User Interface

A graphical user interface according to the present invention will display the video images captured by the CCD 12 and allow the user to view the histogram and provide control input signals through the graphical user interface. The graphical user interface provides a viewing window which allows the user to view the current video images sent from the camera 100. While viewing these video images, the user can also provide control inputs to adjust the contrast, brightness and hue of the picture. The user can also activate an auto-white balancing feature through the graphical user interface by selecting a white or colorless area of the picture. The user selects the white area by placing the cursor over the area and selecting the area using the cursor control device. Once this area is selected, the contrast and colors within the entire image are linearly adjusted in comparison to and based upon this selected white area in order to optimize the picture for the current environment.

When performing this auto-white balancing of the image, all colors within the image are represented by a three component vector consisting of red, green and blue components. Any linear transformation of this color space can be expressed as a three-by-three matrix multiplying this vector. In the preferred embodiment of the present invention, left multiplying matrices are used, therefore this multiplication operation of the multiplying matrix multiplied by the color component vector will yield an adjusted three component color vector. In the $YC_rC_b$ color space, white or gray colors have chrominance component values equal to zero.

When the user selects the white or colorless area of the picture, pixel values in a small area around the selected point are averaged to reduce any inherent noise. The resulting color vector is referred to as the selected color vector. The selected color vector is then transformed to the $YC_rC_b$ color space. It is then determined if the luminance component Y for this color vector is above a fixed level so that noise in the image will not introduce unacceptable errors. It is also determined if the chrominance values $C_r$ and $C_b$ of this color vector are below fixed levels as a check that the selected color represents a physical white. If the luminance component Y is not above the luminance fixed level and the chrominance values $C_r$ and $C_b$ are not below the chrominance fixed levels, then the user is notified of an error, preferably by a beep, and no image adjustment is made. If the values are above and below their respective levels, then a matrix is developed which will transform the selected color to a value referred to as selected gray. This matrix is referred to as the color adjustment matrix. The image white point selected by the user is adjusted by multiplying all pixel RGB values by this matrix.

The color adjustment matrix is arranged in a diagonal fashion, with all elements except the three on the diagonal set equal to zero. This is equivalent to scaling the axis of the color space. The three diagonal, non-zero elements are referred to as red, green and blue components of the matrix. In order to develop the color adjustment matrix, the selected color vector is converted to the $YC_rC_b$ format by multiplying the selected color vector by the matrix used to convert the RGB values to $YC_rC_b$ values, thereby yielding a selected color vector in the $YC_rC_b$ format. A selected gray color vector in the $YC_rC_b$ format is a color matrix with the chrominance values set to zero and only the luminance component value remaining. This selected gray vector in the $YC_rC_b$ format is then converted to the RGB format by multiplying the selected gray vector by the inverse of the matrix used to convert the RGB values to $YC_rC_b$ values, thereby yielding a selected gray vector in the RGB format.

The red component value for the color adjustment matrix is then determined by dividing the red component value from the selected gray vector in the RGB format by the red component value in the selected color vector in the RGB format. The green component value for the color adjustment matrix is then determined by dividing the green component value from the selected gray vector in the RGB format by the green component value in the selected color vector in the RGB format. The blue component value for the color adjustment matrix is then determined by dividing the blue component value from the selected gray vector in the RGB format by the blue component value in the selected color vector in the RGB format. These red, green and blue values are then combined into the color adjustment matrix.

The histogram, discussed above, can also be viewed by the user through the graphical user interface. Once selected, the plot of the histogram will be displayed showing the user the current gain level and the distribution of the weighted pixel values.

The user can also select a high resolution still picture mode rather than the streaming video mode. When the high resolution still picture mode is selected, the CCD is scanned a single line at a time and the image data is transmitted to the host computer, one vertical line at a time, in order to provide a higher resolution image. The digital signal processing for this image is performed as described above.

Within the preferred embodiment of the present invention, the camera 100 is mounted as an integral component within the host computer 200. Preferably, the camera 100 is mounted within the housing of the display 36. However, it should be apparent that any other appropriate arrangement of the camera 100 and the host computer 200 can be used to practice the teachings of the present invention. Preferably, the CCD 12 is an ICX076 ⅕" CIF CCD Imager. As should be apparent to those skilled in the art, any other appropriate imaging device can be used. While the CCD video camera of the preferred embodiment is coupled to a host computer system, it should also be apparent to those skilled in the art that the CCD video camera can be coupled to any other appropriate host system, which has the necessary processing power to perform the digital signal processing, including a cellular telephone or a video telephone.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, while the preferred embodiment of the present invention receives image data from a charge-coupled device, it should be apparent to those skilled in the art that this image data can alternatively be received from any appropriate imaging device, including a CMOS device.

We claim:

1. A video camera for capturing and transmitting raw video data to a receiving device comprising:
   a. an imaging device to capture frame images; and
   b. an interface circuit coupled to the imaging device to receive the frame images and configured for coupling to the receiving device to transmit the frame images to the receiving device, wherein the receiving device is separate from the video camera and the frame images are transmitted as raw data from the interface circuit and processing of the frame images into a video format is performed by the receiving device, the interface circuit further configured to receive control signals from the receiving device, wherein the receiving device is configured to calculate values for control signals and to transmit the control signals to the video camera wherein the control signals include a shutter control signal and an automatic gain control signal.

2. The video camera as claimed in claim 1 wherein the imaging device is a charge-coupled device.

3. The video camera according to claim 1 wherein the values calculated by the receiving device comprise data calculated through an automatic exposure algorithm.

4. The video camera according to claim 1 wherein the calculated values for the control signals are derived from information being transmitted from the video camera to the receiving device.

5. The video camera according to claim 1 wherein the receiving device is a computer system.

6. A video image capturing apparatus for capturing, processing and displaying video images comprising:
   a. a video camera including:
      i. an imaging device to capture frame images; and
      ii. a camera interface circuit coupled to the imaging device to receive the frame images; and
   b. a host receiving device not included within the video camera including:
      i. a host interface circuit coupled to the camera interface circuit to receive the frame images in a raw data format and to transmit control signals to the video camera; and
      ii. a processing circuit coupled to the host interface circuit to receive the frame images in the raw data format, convert the frame images into a video format and to determine appropriate values of the control signals wherein the control signals include a shutter control signal and an automatic gain control signal.

7. The video image capturing apparatus as claimed in claim 6 further comprising a display device coupled to the processing circuit to receive and display the video format of the frame images.

8. The video image capturing apparatus as claimed in claim 7 wherein the video camera has a high resolution still picture mode used when capturing still images and further wherein the video camera transmits frame images one vertical line at a time when in the high resolution still picture mode.

9. The video image capturing apparatus as claimed in claim 7 wherein a histogram is developed by the processing circuit in order to continually adjust the control signals.

10. The video image capturing apparatus as claimed in claim 9 wherein the histogram is used to determine a gain change ratio.

11. The video image capturing apparatus as claimed in claim 10 wherein the gain change ratio is multiplied by a current total gain value to derive appropriate shutter control, automatic gain control and gain adjustment signals.

12. The video image capturing apparatus as claimed in claim 7 further comprising a graphical user interface displayed on the display device, wherein the graphical user interface includes a video window through which the video format of the frame images is displayed.

13. The video image capturing apparatus as claimed in claim 12 wherein the graphical user interface further includes a histogram window through which a histogram developed by the processing circuit in order to continually adjust the control signals is displayed.

14. The video image capturing apparatus as claimed in claim 13 wherein contrast, brightness and hue of the video format of the frame images displayed on the display device through the graphical user interface can be adjusted.

15. The video image capturing apparatus as claimed in claim 14 wherein a white balance of the video format of the frame images displayed on the display can be set by selection of a desired white object within the video window.

16. The video image capturing apparatus as claimed in claim 15 wherein the processing circuit adjusts the video format to display the desired white object as white, and further wherein the processing circuit also scales contrasting color components according to the desired white object, using a color adjustment matrix.

17. The video image capturing apparatus as claimed in claim 16 wherein the processing circuit adjusts the control signals according to the color adjustment matrix.

18. A graphical user interface including a video window for displaying video images and a white balance control wherein color and contrast of the video images is controlled by selection of a desired white object within the video window,
   wherein the video window is displayed on a host system including a display and an input device,
   wherein raw data representing the video images is received from a video camera,
   and wherein the host system further includes a processing circuit which processes the raw data and adjust the video images to display the desired white object as white and further wherein the processing circuit also scales contrasting color components according to the desired white object, using a color adjustment matrix.

19. The graphical user interface as claimed in claim 18 wherein the processing circuit provides control signals to the video camera adjusted according to the color adjustment matrix.

20. A video image capturing apparatus for capturing, processing and displaying video images comprising:
   a. a video camera including:
      i. an imaging device to capture frame images; and
      ii. a camera interface circuit coupled to the imaging device to receive the frame images; and
   b. a host receiving device separate from the video camera including:
      i. a host interface circuit coupled to the camera interface circuit to receive the frame images in a raw data format and to transmit control signals to the video camera;
      ii. a processing circuit coupled to the host interface circuit to receive the frame images in the raw data format, convert the frame images into a video format and to determine appropriate values of the control signals;
      iii. a display device coupled to the processing circuit to receive and display the video format of the frame images; and
      iv. a graphical user interface displayed on the display device including a video window through which the video format of the frame images is displayed wherein the control signals include a shutter control signal and an automatic gain control signal.

21. The video image capturing apparatus as claimed in claim 20 wherein a histogram is developed by the processing circuit in order to continually adjust the control signals and further wherein the graphical user interface includes a histogram window through which the histogram is displayed.

22. The video image capturing apparatus as claimed in claim 21 wherein the histogram is used to determine a gain change ratio.

23. The video image capturing apparatus as claimed in claim 22 wherein a user can manually adjust contrast, brightness and hue of the video format of the frame images displayed on the display device through the graphical user interface.

24. The video image capturing apparatus as claimed in claim 23 wherein a white balance of the video format of the frame images displayed on the display is set by selecting a desired white object within the video window.

25. The video image capturing apparatus as claimed in claim 24 wherein the processing circuit adjusts the video format to display the desired white object as white, and further wherein the processing circuit also scales contrasting color components and adjusts the control signals according to the desired white object, using a color adjustment matrix.

26. A video image capturing apparatus for capturing, processing and displaying video images comprising:
   a. a video camera including:
      i. an imaging device to capture frame images; and
      ii. a camera interface circuit coupled to the imaging device to receive the frame images; and
   b. a host receiving device not included within the video camera including:
      i. a host interface circuit coupled to the camera interface circuit to receive the frame images in a raw data format and to transmit control signals to the video camera, wherein the control signals include a shutter control signal and an automatic gain control signal;
      ii. a processing circuit coupled to the host interface circuit to receive the frame images in the raw data format, convert the frame images into a video format and to determine appropriate values of the control signals; and
      iii. a display device coupled to the processing circuit to receive and display the video format of the frame images and to determine appropriate vales of the control signals;

wherein a histogram is developed by the processing circuit in order to continually adjust the control signals and to determine a gain change ratio.

27. The image video capturing apparatus as claimed in claim 26 wherein the gain change ratio is multiplied by a current total gain value to derive appropriate shutter control, automatic gain control and gain adjustment signals.

28. A video image capturing apparatus for capturing, processing and displaying video images comprising:
   a. a video camera including:
      i. an imaging device to capture frame images; and
      ii. a camera interface circuit coupled to the imaging device to receive the frame images; and
   b. a host receiving device separate from the video camera including:
      i. a host interface circuit coupled to the camera interface circuit to receive the frame images in a raw data format and to transmit control signals to the video camera;
      ii. a processing circuit coupled to the host interface circuit to receive the frame images in the raw data format, convert the frame images into a video format and to determine appropriate values of the control signals;
      iii. a display device coupled to the processing circuit to receive and display the video of the frame images; and
      iv. a graphical user interface displayed on the display device including a video window through which the video format of the frame images is displayed;

wherein a histogram is developed by the processing circuit to determine a gain change ratio and to continually adjust the control signals and further wherein the graphical user interface includes a histogram window through which the histogram is displayed.

29. The video image capturing apparatus as claimed in claim 28 wherein a user can manually adjust contrast, brightness and hue of the video format of the frame images displayed on the display device through the graphical user interface.

30. The video image capturing apparatus as claimed in claim 28 wherein a white balance of the video format of the frame images displayed on the display is set by selecting a desired white object within the video window wherein the processing circuit adjusts the video format to display the desired white object as white.

31. The video image capturing apparatus as claimed in claim 28 wherein the processing circuit also scales contrasting color components and adjusts the control signals according to the desired white object, using a color adjustment matrix.

32. A video image capturing apparatus for capturing, processing and displaying video images comprising:
   a. a histogram used to determine a gain change ratio; and
   b. a current total gain value multiplied by the gain change ratio to derive appropriate shutter control, automatic gain control and gain adjustment signals;

wherein a user can manually adjust contrast, brightness and hue of a video format of frame images displayed on a display device through a graphical user interface, and further wherein a white balance of the video format of the frame images displayed on the display device is set by selecting a desired white object within a video window of the display device, and a processing circuit also scales contrasting color components and adjusts the control signals according to the desired white object, using a color adjustment matrix.

* * * * *

UNITED STATES PATENT AND TRADEMARK OFFICE
CERTIFICATE OF CORRECTION

PATENT NO. : 6,285,398 B1  Page 1 of 1
DATED : September 4, 2001
INVENTOR(S) : Shinsky et al.

It is certified that error appears in the above-identified patent and that said Letters Patent is hereby corrected as shown below:

<u>Column 14,</u>
Line 6, replace "determine appropriate vales" with -- determine appropriate values --.

Signed and Sealed this

Ninth Day of April, 2002

Attest:

Attesting Officer

JAMES E. ROGAN
Director of the United States Patent and Trademark Office